(12) United States Patent
Yamamoto et al.

(10) Patent No.: US 6,511,060 B2
(45) Date of Patent: Jan. 28, 2003

(54) ENGINE MOUNT (75) Inventors: Kentaro Yamamoto, Osaka (JP); Hironori Kato, Osaka (JP); Tsuyoshi Inada, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/924,614

(22) Filed: Aug. 9, 2001

(65) Prior Publication Data
US 2002/0117790 A1 Aug. 29, 2002

(30) Foreign Application Priority Data
Feb. 23, 2001 (JP) ......................................... 2001-048039

(51) Int. Cl.⁷ ................................................. B60K 5/12
(52) U.S. Cl. .................................................. 267/140.13
(58) Field of Search ..................... 267/140.11, 140.12, 267/140.13, 270–282; 403/228

(56) References Cited
U.S. PATENT DOCUMENTS 4,586,840 A * 5/1986 Buhl ............................ 403/228
5,413,319 A * 5/1995 Hein et al. ............. 267/140.12

* cited by examiner

Primary Examiner—Christopher P. Schwartz
(74) Attorney, Agent, or Firm—Wenderoth, Lind & Ponack, L.L.P.

(57) ABSTRACT

An engine mount has a stopper rubber portion constituted of an outer peripheral flange protruding radially outwardly from the engine side metal fitting and a coating rubber covering an outer periphery of said outer peripheral flange. A radius of curvature of contact parts positioned at one direction of two radial directions orthogonal to each other in a radial plane substantially equals to a radius of curvature of an inner periphery of the body side metal fitting and a thickness of the coating rubber positioned in said one direction is constant in a circumferential direction thereof, whereby the contact parts positioned in said one direction are widely brought into contact with the inner periphery of the body side metal fitting and distorted uniformly. The distortion of the stopper rubber portion is also made uniform when applying a load thereto.

18 Claims, 5 Drawing Sheets

ENGINE MOUNT

BACKGROUND OF THE INVENTION

The present invention relates to an engine mount used for installing an engine on a vehicle body.

Figure 5:
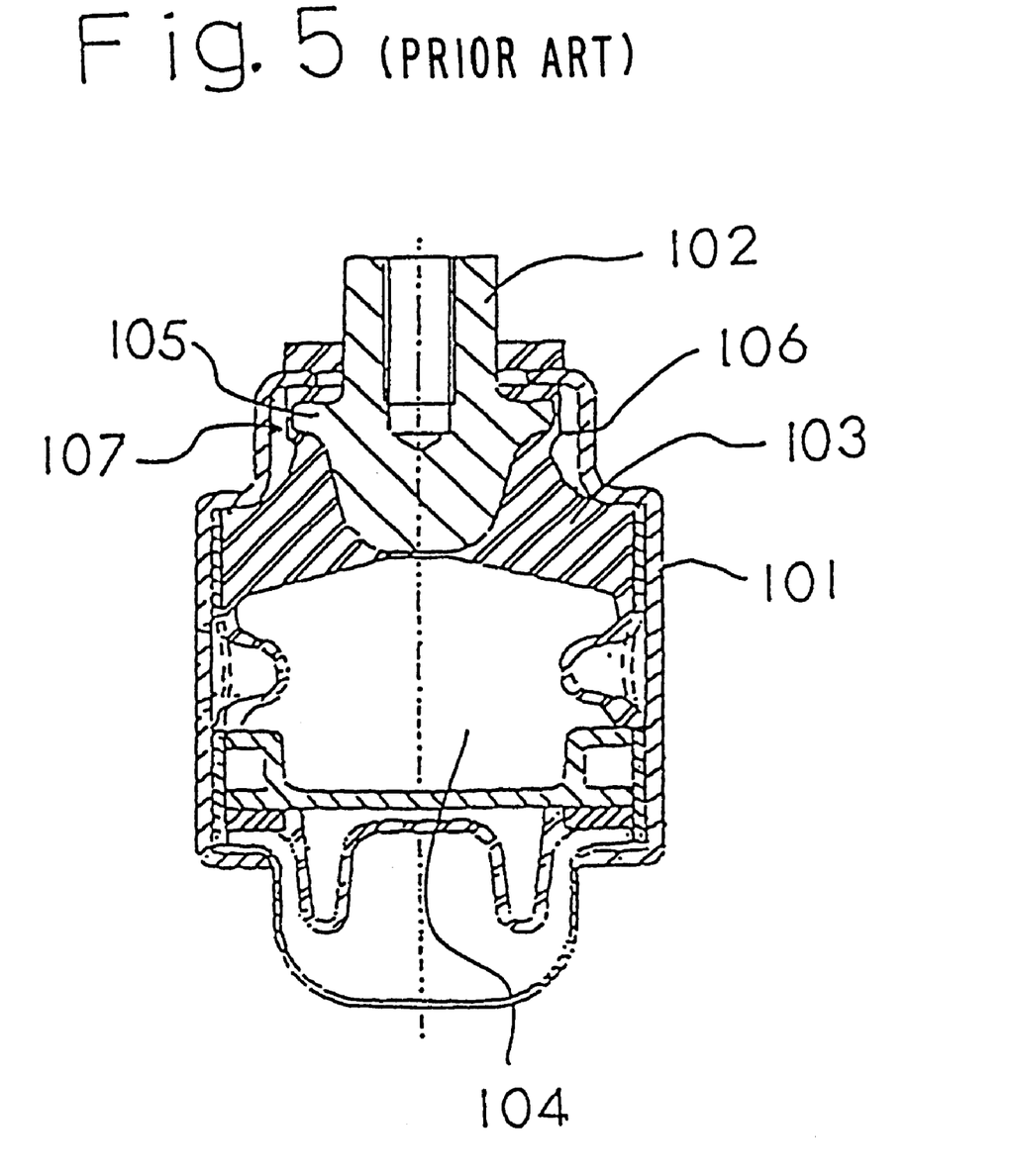
FIG. 5 is a vertical sectional view showing a construction of a conventional engine mount.

In general, when an automobile engine and the like is installed on a vehicle body, engine mounts are interposed therebetween in order to control vibration transmission from an engine to a vehicle body. One prior art example of an engine mount is shown in FIG. 5. Said engine mount comprises a body side metal fitting 101 fixed to a vehicle body, an engine side metal fitting 102 fixed to an engine, a vibration isolating base body 103 formed of a rubber elastic body interposed between both of the metal fittings 101 and 102, and a liquid chamber 104. The engine side metal fitting 102 is provided with a stopper rubber portion 107 substantially in a disc shape protruding radially outwardly from said metal fitting constituted of an outer peripheral flange 105 protruding radially outwardly from said metal fitting and a coating rubber 106 covering the outer periphery of the outer peripheral flange 105. The engine side metal fitting 102 is disposed substantially concentrically with and spaced from the body side metal fitting and the stopper rubber portion 107 is opposed to an inner periphery of the body side metal fitting 101 so as to absorb the impact force generated at the time when a load in a radial direction is applied and prevent the deterioration of riding comfort on a vehicle.

However, since the stopper rubber portion 107 is concentrically disposed at the inside of the body side metal fitting 101, a radius of curvature of the outer periphery thereof is smaller than that of the inner periphery of the body side metal fitting 101. As a result, at the time when a load in the radial direction is applied, the edge of the stopper rubber portion 107 is first brought into contact with a small area of the inner periphery of the body side metal fitting, and thereafter, the contact edge is distorted inwardly to extend gradually the contact area of the stopper rubber portion 107 with the body side metal fitting.

Consequently, the stopper rubber portion 107 is greatly distorted at the edge portion to be first brought into contact with the body side metal fitting 101. Thus, when a radial load is repeatedly applied to the engine mount during vehicle running on a bad road for a long period, it is likely to cause cracks of the stopper rubber portion.

SUMMARY OF THE INVENTION

In view of the above, it is an object of the present invention to improve the durability of the stopper rubber portion in an engine mount, and another object of the present invention is to enhance riding comfort by damping a vibration transmitted from the stopper rubber portion to a vehicle body.

In order to attain the above objects, the present invention intends to uniform the distortion of the stopper rubber portion to the utmost by contacting widely the stopper rubber portion with the body side metal fitting at the time when a radial load is applied to the engine mount comprising a cylindrical body side metal fitting secured to a vehicle body, an engine side metal fitting secured to an engine, a vibration isolating base body made of an elastic rubber body interposed between the two metal fittings and a stopper rubber portion substantially in a disc shape protruding radially outwardly from the engine side metal fitting and disposed substantially concentrically with and spaced from the body side metal fitting. "Radial" or "radially" means the direction perpendicular to the axial direction passing through a center of the body side metal fitting. The stopper rubber portion is widely contacted with the body side metal fitting as follows.

Assuming that two radial directions orthogonal to each other in a radial plane perpendicular to the axis of the body side metal fitting are one direction and another direction, respectively, contact parts that contact the inner periphery of the body side metal fitting when a load is applied in one direction are denoted as one-direction contact parts and contact parts that contact the inner periphery of the body side metal fitting when a load is applied in another direction are denoted as another-direction contact parts. In the present invention, a center of curvature of an outer periphery of each one-direction contact part positioned at one direction of two radial directions orthogonal to each other in a radial plane is displaced from a center of curvature of an inner periphery of the body side metal fitting in the one direction and a radius of curvature of the outer periphery is arranged to be larger than a radius of curvature of an imaginary circle passing through a single point of the outer periphery of the stopper rubber portion concentrically with the inner periphery of the body side metal fitting. In such a manner, as compared with such a case that the outer periphery of the stopper rubber portion is arranged to be a circle, i.e. the imaginary circle, concentric with the inner periphery of the body side metal fitting, the one-direction contact parts contact with the body side metal fitting over a wide region and local rubber distortion is diminished. When the radius of curvature of the one-direction contact parts is larger than the imaginary circle, the contact parts contact widely with the inner periphery of the body side metal fitting. However, when the radius of curvature of the one-direction contact parts is larger than the inner periphery of the body side metal fitting, each of the contact areas of the contact parts becomes small. Accordingly, the radius of curvature of the one-direction contact parts shall be arranged to be larger than the imaginary circle and equal to or smaller than the radius of curvature of the inner periphery of the body side metal fitting.

Namely, the present invention provides an engine mount comprising a cylindrical body side metal fitting secured to a vehicle body, an engine side metal fitting secured to an engine, a vibration isolating base body made of an elastic rubber body interposed between the two metal fittings and a stopper rubber portion formed substantially in a disc shape protruding radially outwardly from the engine side metal fitting and disposed substantially concentrically with and spaced from the body side metal fitting. The stopper rubber portion is arranged in such a manner that a center of curvature of an outer periphery positioned at one direction of two radial directions orthogonal to each other in a radial plane being displaced from a center of curvature of an inner periphery of the body side metal fitting to the one direction and a radius of curvature of the outer periphery being arranged to be larger than a radius of curvature of an imaginary circle passing through a single point of the outer periphery of the stopper rubber portion concentrically with the inner periphery of the body side metal fitting and equal to or smaller than a radius of curvature of the inner periphery of the body side metal fitting, so that contact parts contacting with the body side metal fitting in the one direction of two radial directions orthogonal to each other are brought into contact with the body side metal fitting over a wide region.

Especially when the radius of curvature of the one-direction contact parts is arranged to be substantially equal to that of the inner periphery of the body side metal fitting, the entire outer periphery of the one-direction contact parts is brought into contact with the body side metal fitting.

The stopper rubber portion comprises an outer peripheral flange protruding radially outwardly from the engine side metal fitting and a coating rubber covering an outer periphery of said outer peripheral flange. Accordingly, the above-mentioned arrangement of the radius of curvature of the one-direction contact parts corresponds to the arrangement for the outer periphery of the coating rubber.

From the above viewpoint, the configuration of the outer peripheral flange and the rubber thickness of the coating rubber are not required to be limited specifically. However, taking the durability of rubber into consideration, it is preferable that the distortion of rubber at the time when the coating rubber is brought into contact with the inner periphery of the body side metal fitting is made uniform Accordingly, it is preferable that the coating rubber positioned in the one-direction contact parts has a constant thickness in the circumferential direction thereof. In order to obtain said constant thickness, a center of curvature of the outer periphery of the outer peripheral flange positioned at the one-direction contact part is displaced from a center of curvature of an outer periphery of the coating rubber to one direction and a radius of curvature of said outer periphery is arranged to be equal to a radius of curvature of the outer periphery of the coating rubber.

Namely, the present invention also provides an engine mount comprising a cylindrical body side metal fitting secured to a vehicle body, an engine side metal fitting secured to an engine, a vibration isolating base body made of an elastic rubber body interposed between the two metal fittings and a stopper rubber portion substantially in a disc shape protruding radially outwardly from the engine side metal fitting and disposed substantially concentrically with and spaced from the body side metal fitting, the stopper rubber portion is constituted of an outer peripheral flange protruding radially outwardly from the engine side metal fitting and a coating rubber covering an outer periphery of said outer peripheral flange, a center of curvature of said outer periphery of the outer peripheral flange positioned at said contact parts being displaced from a center of curvature of an outer periphery of the coating rubber positioned at said contact parts to said one direction and a radius of curvature of said outer periphery being equal to a radius of curvature of the outer periphery of the coating rubber, so that the coating rubber of the contact parts positioned in said one direction has constant thickness in a circumferential direction thereof.

It is more preferable that the outer periphery of the coating rubber is substantially of a circle shape and the outer periphery of the outer peripheral flange is substantially of an ellipse shape constituting said one-direction contact parts by the outer periphery positioned in the direction of a short diameter of the ellipse. Although the rubber thickness of the another-direction contact parts becomes thin, the rubber thickness of the coating rubber at the one-direction contact parts becomes thick, which makes the riding comfort enhanced.

Namely, the present invention also provides an engine mount comprising a cylindrical body side metal fitting secured to a vehicle body, an engine side metal fitting secured to an engine, a vibration isolating base body made of an elastic rubber body interposed between the two metal fittings and a stopper rubber portion substantially in a disc shape protruding radially outwardly from the engine side metal fitting and disposed substantially concentrically with and spaced from the body side a metal fitting, said stopper rubber portion is constituted of an outer peripheral flange protruding radially outwardly from the engine side metal fitting and a coating rubber covering an outer periphery of said outer peripheral flange, said outer periphery of the outer peripheral flange being formed substantially in an ellipse shape constituting said contact parts positioned in said one direction by the outer periphery positioned in the direction of a short diameter of the ellipse, a center of curvature of said outer periphery of the outer peripheral flange positioned in the direction of a short diameter of the ellipse being displaced from a center of curvature of an outer periphery of the coating rubber to said one direction and a radius of curvature of said outer periphery being equal to a radius of curvature of the outer periphery of the coating rubber, so that the contact parts positioned in said one direction has a constant thickness in a circumferential direction thereof.

Since a load applied to the engine mount in the radial directions thereof orthogonal to each other during the vehicle running is likely to be greater in one direction than in another direction, it is preferred that the above one-direction contact parts are disposed in alignment with said one direction, i.e. a principal load applying direction of the engine mount, so that both the durability of the stopper rubber portion and the riding comfort are enhanced.

DETAILED DESCRIPTION OF THE PREFERRED EMBODIMENT

The invention will now be described in great detail with reference to the accompanying drawings.

Figure 1:
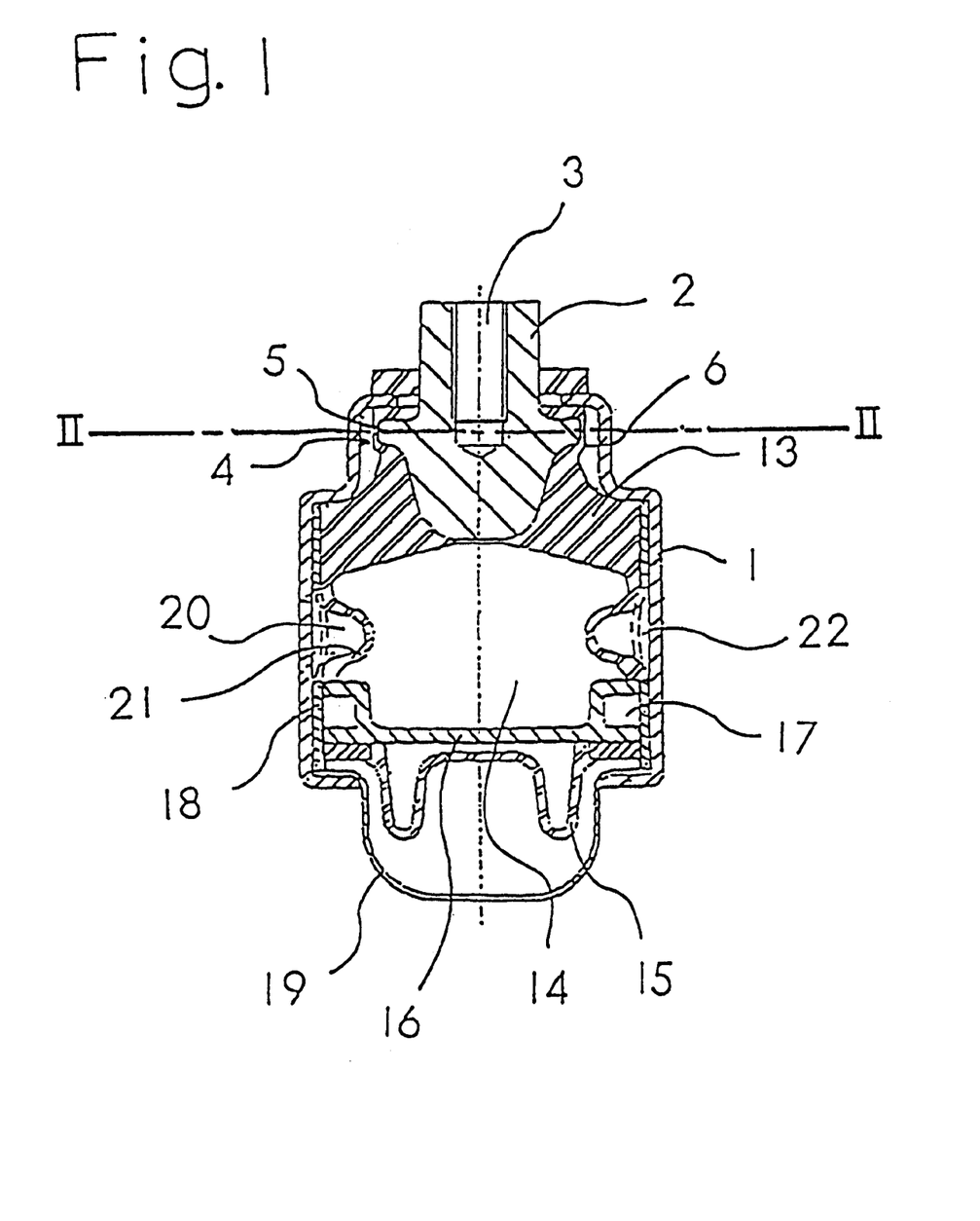
FIG. 1 is a vertical sectional view showing a construction of the engine mount of the present invention.

As shown in FIG. 1, the engine mount according to the present invention comprises a cylindrical body side metal fitting 1 secured to a vehicle body, an engine side metal fitting 2 disposed concentrically inside the vicinity of an upper opening portion of the body side metal fitting 1 and connected to a bracket of a vibration generating body such as an automobile engine, a vibration isolating base body 13 made of an elastic rubber body interposed between the two metal fittings 1 and 2, a diaphragm 15 made of a rubber membrane attached to the lower opening portion of the body side metal fitting 1, a liquid chamber 14 formed between the diaphragm 15 and the vibration isolating base body 13 and a partition member 16 partitioning the liquid chamber 14 into a main liquid chamber positioned at the side of the vibration isolating main body and an auxiliary liquid chamber positioned at the side of the diaphragm. The partition member 16 is provided with an orifice 17 communicating the main liquid chamber and the auxiliary liquid chamber. Accordingly the engine mount shown in FIG. 1 is a two-chamber liquid filled engine mount supporting an engine with the vibration damping function attained by the vibration isolating function of the vibration isolating base body and the liquid flow effect of the liquid filled in the liquid chamber passing through the orifice 17.

In this embodiment, a cylindrical metal fitting 18 is fitted into the body side metal fitting 1, and the vibration isolating base body 13 made of a rubber elastic body is mounted by vulcanization adhesion between the inner face of the cylindrical metal fitting 18 and the engine side metal fitting. The diaphragm 15 and the partition member 16 are fitted to the lower opening portion of the cylindrical metal fitting 18 and are fixed not so as to drop out therefrom by caulking the lower edge of the cylindrical metal fitting 18. The cylindrical metal fitting 18 is fitted into the body side metal fitting 1 up to a stepped portion on the upper side from the lower opening portion and is fixed not so as to drop out therefrom by bending a lower end portion of the body side metal fitting 1 inwardly. A cover 19 covering the outside of the diaphragm 15 is attached together with the cylindrical metal fitting 18.

A rubber elastic membrane 21 protruding inwardly in the main liquid chamber is provided to form an air chamber 20 positioning at one or more openings formed at the cylindrical metal fitting 18 constituting the peripheral side wall of the main liquid chamber. The rubber elastic membrane 21 is fixed to the cylindrical metal fitting 18 integrally with the vibration isolating base body 13 by vulcanization adhesion, however, it may be formed separately from the vibration isolating base body 13. The air chamber 20 may communicate with outside air or may be a sealed chamber with no communication to outside air.

In this embodiment, although the vibration isolating base body 13, the partition member 16, the diaphragm 15, and the rubber elastic membrane 21 are fixed to the cylindrical metal fitting 18 installed in the body side metal fitting 1, since the cylindrical metal fitting 18 and the body side metal fitting 1 become integral finally as an end product, the cylindrical metal fitting 18 may be omitted by directly molding the vibration isolating base body 13 and the rubber elastic membrane 21 to the inner face of the body side metal fitting 1 and directly attaching the partition member 16 and the diaphragm 15 to the body side metal fitting 1.

The upper portion of the body side metal fitting 1 extending upwardly from the stepped portion is bent radially inwardly at slightly above a stopper rubber portion 4, so that the stopper function is obtained when vibrations of a large amplitude are applied to the engine mount in the axial direction.

Figure 2:
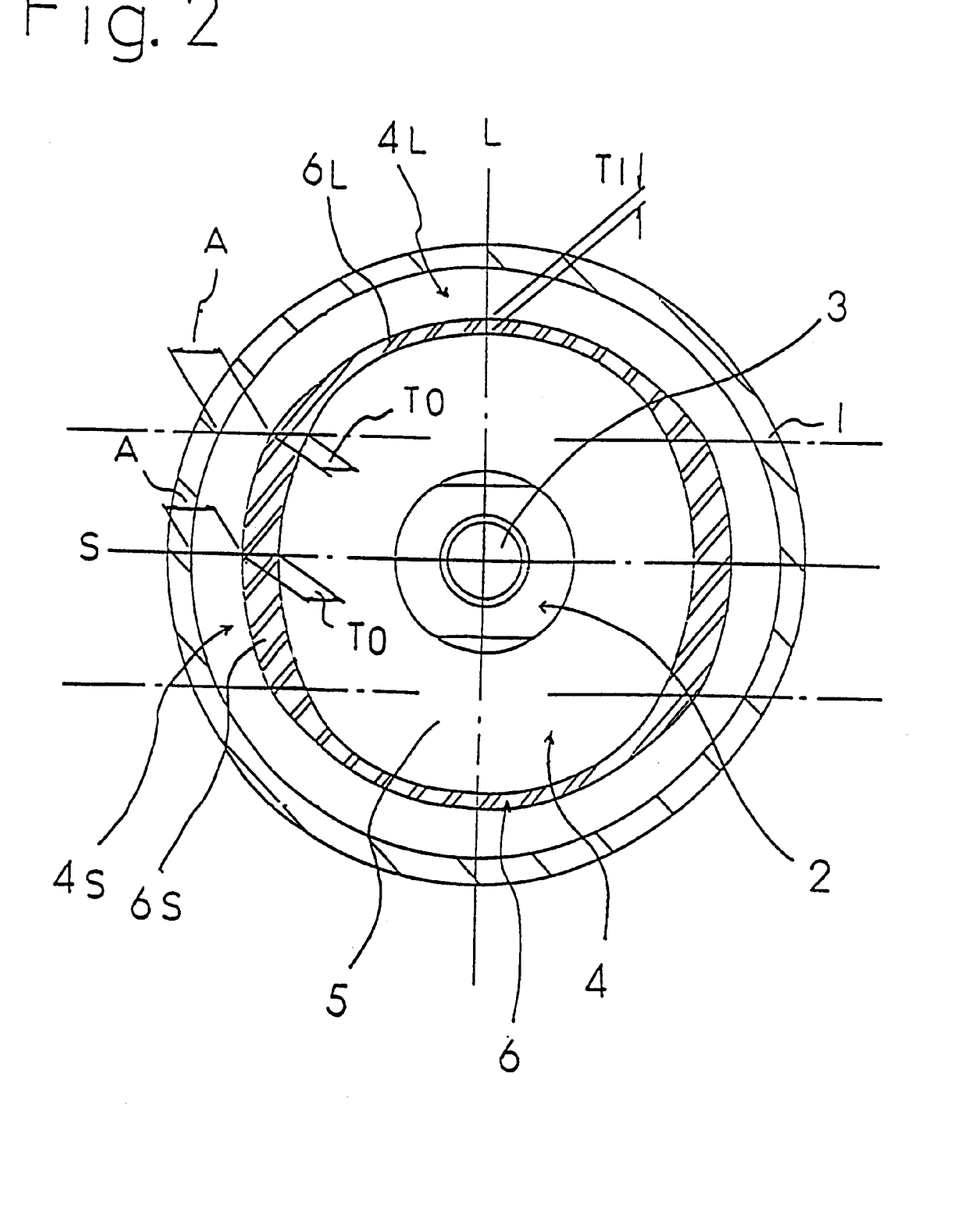
FIG. 2 is an enlarged transverse sectional view showing the relation between the engine side metal fitting and the body side metal fitting.

As shown in FIG. 1 and FIG. 2, the engine side metal fitting 2 substantially of a column shape is equipped with a bolt hole 3 at the upper end in the axial direction thereof for fastening thereto a bolt of the engine side. From the vicinity of the center portion of the engine side metal fitting 2, a stopper rubber portion 4 substantially in a disc shape protrudes radially outwardly so as to oppose the inner periphery of the body side metal fitting 1.

The stopper rubber portion 4 is provided with one-direction contact pars 4S contacting with the body side metal fitting 1 when a load is applied in one direction (S) of two directions orthogonal with each other in a radial plane and another-direction contact parts 4L contacting with the body side metal fitting 1 when a load is applied in another direction (L) of two directions orthogonal with each other in a radial plane.

The stopper rubber portion 4 is constituted of an outer peripheral flange 5 protruding radially outwardly from the engine side metal fitting and a coating rubber 6 covering an outer periphery of said outer peripheral flange 5. The outer peripheral flange 5 is formed substantially in an ellipse shape, wherein the one-direction (S) sides are positioned in the direction of a short diameter of the ellipse and the another-direction (L) sides are positioned in the direction of a long diameter of the ellipse. The engine mount is installed in such a manner that the one-direction (S) is in alignment with the principal load applying direction of the engine mount, for example, a longitudinal direction of the automobile. The center of curvature of the outer periphery of the outer peripheral flange 5 positioned in the one-direction side or the short diameter side S is displaced from the center of curvature of the inner periphery of the body side metal fitting 1 to the one-direction and the radius of curvature of the outer periphery is arranged to be equal substantially to the radius of curvature of the inner periphery of the body side metal fitting 1.

The coating rubber 6 is made of synthetic rubber or natural rubber, and absorbs impact force applied at the time when said coating rubber 6 is brought into contact with the body side metal fitting, thus preventing the reduction of the riding comfort. The center of the curvature of the outer periphery of a coating rubber 6S positioned at the one-direction contact parts 4S is displaced from the center of the curvature of the inner periphery of the body side metal fitting 1 and the radius of curvature of the outer periphery is arranged to be equal substantially to the inner periphery of the body side metal fitting 1. Accordingly, the rubber thickness (TO) positioned in the one-direction or the short diameter direction S is constant in the circumferential direction. An outer periphery of a coating rubber 6S positioned at the one-direction contact parts 4S is spaced from the inner periphery of the body side metal fitting 1 at a constant distance (A) in the circumferential direction. The outer periphery of the coating rubber 6 is formed substantially in a circle shape and the rubber thickness (TO) of the coating rubber 6S positioned at the one-direction contact parts 4S is set to be greater than the rubber thickness (T1) of the coating rubber 6L positioned at the another-direction contact parts 4L.

As the distance (A) between the one-direction contact parts 4S and the inner periphery of the body side metal fitting 1 is constant in one-direction (S), the overall region of the one-direction contact parts 4S contacts with the inner periphery of the body side metal fitting 1.

In case the rubber thickness of the coating rubber is uniform overall in its circumference as in the conventional cases, the rubber thickness of one-direction (S) increases with leaving the center of the one-direction contact parts and the distortion of the coating rubber becomes uneven. However, in case the rubber thickness (TO) in one-direction (S) is constant as in the present invention, the distortion becomes uniform and the stopper rubber portion 4 never yields a great local distortion, thereby preventing the occurrence of cracks.

When the load is applied in the another-direction (L), the another-direction contact parts 4L covered with the coating rubber 6L having a smaller rubber thickness contact with the inner periphery of the body side metal fitting 1. As a spring constant of the coating rubber 6L is high, the riding comfort deteriorates. However, since the load applying direction is not the principal direction, the influence given to the riding comfort may be ignored. The outer periphery of the stopper rubber portion 4 is formed to be substantially a circle shape, so that the distance between the inner periphery of the body side metal fitting 1 and the stopper rubber portion 4 is made substantially constant, which prevents the another-direction contact parts 4L from easily contacting with the inner periphery of the body side metal fitting.

Figure 3A:
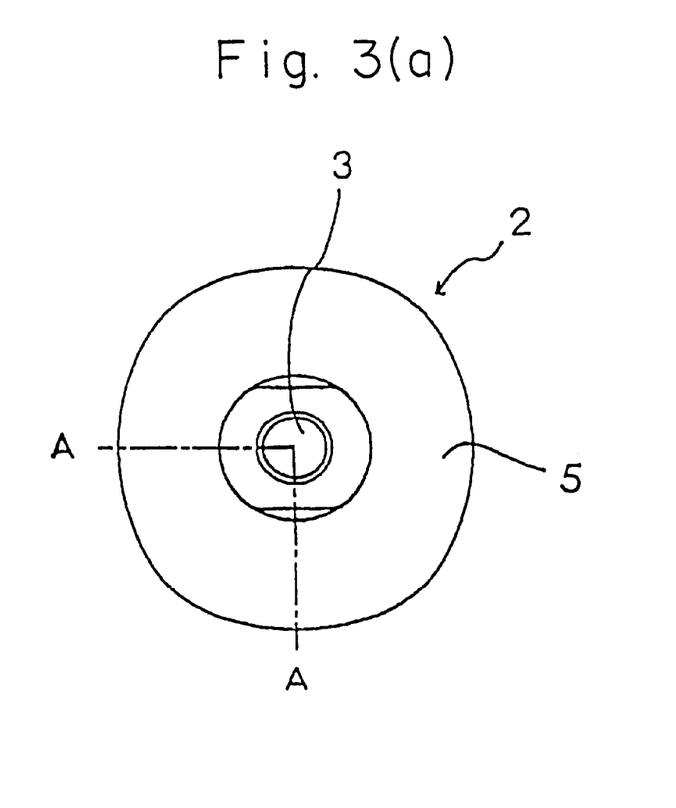
FIG. 3a is a plan view of the engine side metal fitting and FIG. 3b is a cross sectional view taken along the line A—A in FIG. 3a, in which the left side thereof shows the one-direction side S(short diameter side) and the right side thereof shows the another-direction side L(long diameter side).
Figure 3B:
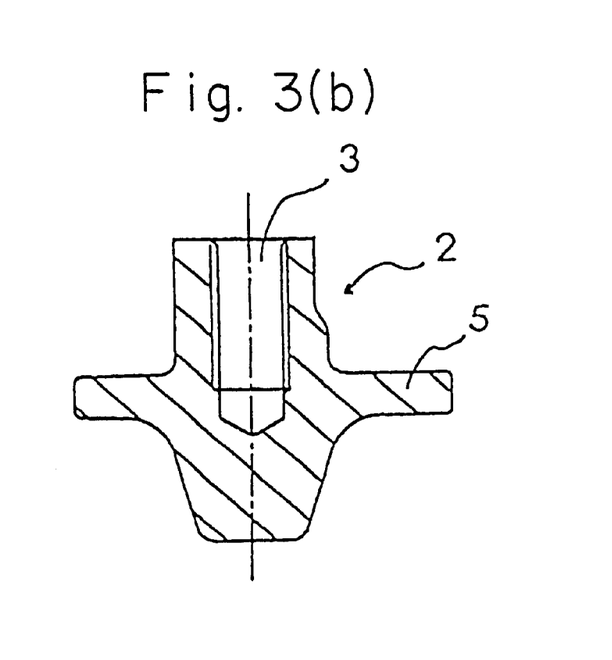
Figure 4:
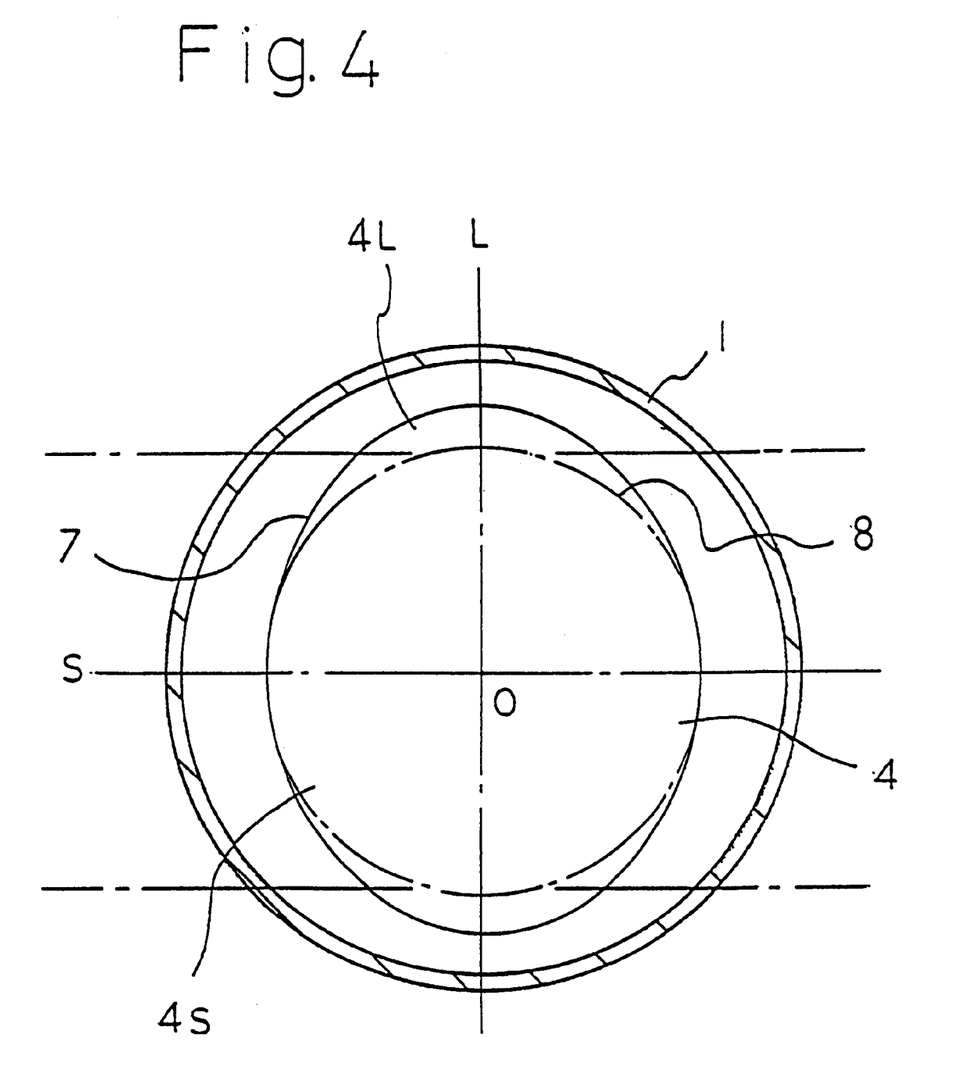
FIG. 4 is an enlarged transverse sectional view showing the relation between the engine side metal fitting and the body side metal fitting in accordance with the another embodiment of the present invention.

It should be understood that the foregoing description is only illustrative of the invention. Various alternatives and modifications can be devised by those skilled in the art without departing from the invention. For example, as shown in FIG. 3, the radius of curvature of the outer periphery 7 of the one-direction contact parts 4S is not limited to be arranged to be substantially equal to the radius of curvature of the inner periphery of the body side metal fitting, but may be arranged to be smaller than the radius of curvature of the inner periphery of the body side metal fitting 1, provided being arranged to be larger than the radius of curvature of the imaginary circle 8. As compared with such a case that the outer periphery 7 of the stopper rubber portion 4 is formed in a circle shape equal to the imaginary circle 8, the one-direction contact parts 4S contact more widely with the inner periphery of the body side metal fitting 1. The imaginary circle 8 indicated by a dash and dotted line in FIG. 3 is a circle inscribed to the outer periphery 7 of the stopper rubber portion 4 having a center at the axial center O of the body side metal fitting 1.

What is claimed is:

1. An engine mount comprising:
   a cylindrical body side metal fitting adapted to be secured to a vehicle body;
   an engine side metal fitting adapted to be secured to an engine;
   a vibration isolating base body made of an elastic rubber body interposed between said cylindrical body side metal fitting and said engine side metal fitting; and
   a stopper portion protruding radially outwardly from said engine side metal fitting, said stopper portion being substantially disc-shaped and disposed substantially concentrically with and spaced from the body side metal fitting,
   said stopper portion being arranged in such a manner that a center of curvature of an outer periphery of said stopper portion, located at one direction of two radial directions that are orthogonal to each other in a radial plane, is displaced from a center of curvature of an inner periphery of said cylindrical body side metal fitting along the one direction,
   wherein said stopper portion comprises an outer peripheral flange protruding radially outwardly from said engine side metal fitting, and a rubber coating that covers an outer periphery of said outer peripheral flange,
   wherein the outer periphery of said stopper portion, at the one direction, has a radius of curvature that is larger than a radius of curvature of an imaginary circle that passes through a single point on the outer periphery of said stopper portion and is concentric with the inner periphery of said cylindrical body side metal fitting, and
   wherein the radius of curvature of said stopper portion, at the one direction, is equal to or smaller than a radius of curvature of the inner periphery of said cylindrical body side metal fitting, so that contacting portions of said stopper portion, which are adapted to contact said cylindrical body side metal fitting in the one direction of the two radial directions, can contact the inner periphery of said cylindrical body side metal fitting over a wide area.

2. An engine mount as claimed in claim 1, wherein said stopper portion comprises an outer peripheral flange protruding radially outwardly from said engine side metal fitting, and a rubber coating that covers an outer periphery of said outer peripheral flange,
   wherein a center of curvature of the outer periphery of said outer peripheral flange at the contacting portions is displaced from a center of curvature of curvature of an outer periphery of said rubber coating at said contacting portions along the one direction, and
   wherein a radius of curvature of the outer periphery of said outer peripheral flange is equal to a radius of curvature of the outer periphery of said rubber coating, so that said rubber coating at the contacting portions located along the one direction has a constant thickness in a circumferential direction thereof.

3. An engine mount as claimed in claim 2, wherein the one direction of the two radial directions, which are orthogonal to each other in a radial plane, is a principal laod applying direction of the engine mount.

4. An engine mount as claimed in claim 3, wherein the thickness of the rubber layer at the contact portions is greater than the thickness of the rubber coating located in the other direction of the two radial directions.

5. An engine mount as claimed in claim 1, wherein said stopper portion comprises an outer peripheral flange protruding radially outwardly from said engine side metal fitting and a rubber coating that covers an outer periphery of said outer peripheral flange,
   wherein the outer periphery of said cylindrical outer peripheral flange is formed substantially in the shape of an ellipse so that the contacting portions, located along the one direction, are positioned in the direction of a short diameter of the ellipse,
   wherein a center of curvature of the outer periphery of said outer peripheral flange, positioned in the direction of the short diameter of the ellipse, is displaced from a center of curvature of an outer periphery of said rubber coating in the one direction, and
   wherein a radius of curvature of the outer periphery of said outer peripheral flange is substantially equal to a radius of curvature of the outer periphery of said rubber coating so that the contacting portions of said rubber coating, positioned in the one direction have a constant thickness in a circumferential direction thereof.

6. An engine mount as claimed in claim 5, wherein the one direction of the two radial directions, which are orthogonal to each other in a radial plane, is a principal load applying direction of the engine.

7. An engine mount as claimed in claim 6, wherein the thickness of the rubber layer at the contact portions is greater than the thickness of the rubber coating located in the other direction of the two radial directions.

a cylindrical body side metal fitting adapted to be secured to a vehicle body;
   an engine side metal fitting adapted to be secured to an engine;
   a vibration isolating base body formed of an elastic rubber body interposed between said cylindrical body side metal fitting and said engine side metal fitting; and
   a disc-shaped stopper portion protruding radially outwardly from said engine side metal fitting and being disposed substantially concentrically with and spaced from said cylindrical body side metal fitting,
   said stopper portion being arranged such that a center of curvature of an outer periphery of said stopper portion, which is positioned along one direction of two radial directions that are orthogonal to each other in a radial plane, is displaced from a center of curvature of an inner periphery of said cylindrical body side metal fitting in the one direction, wherein said rubber stopper portion comprises an outer peripheral flange protruding radially outwardly from said engine side metal fitting and a rubber coating covering an outer periphery of said outer peripheral flange, wherein the outer periphery of said stopper portion has a radius of curvature that is substantially equal to a radius of curvature of the inner periphery of said cylindrical body side metal fitting, so that contacting portions of said stopper portion will contact said cylindrical body side metal fitting in response to a radial load along the one direction of the two radial directions over a wide contact area.

8. An engine mount as claimed in claim , wherein the one direction of the two radial directions, which are orthogonal to each other in a radial plane, is a principal load applying direction of the engine mount.

9. An engine mount as claimed in claim 1, wherein the thickness of the rubber layer at the contact portions is greater than the thickness of the rubber coating located in the other direction of the two radial directions.

10. An engine mount comprising:
a cylindrical body side metal fitting adapted to be secured to a vehicle body;
an engine side metal fitting adapted to be secured to an engine;
a vibration isolating base body formed of an elastic rubber body interposed between said cylindrical body side metal fitting and said engine side metal fitting; and
a disc-shaped stopper portion protruding radially outwardly from said engine side metal fitting and being disposed substantially concentrically with and spaced from said cylindrical body side metal fitting,
said stopper portion being arranged such that a center of curvature of an outer periphery of said stopper portion, which is positioned along one direction of two radial directions that are orthogonal to each other in a radial plane, is displaced from a center of curvature of an inner periphery of said cylindrical body side metal fitting in the one direction.

wherein the outer periphery of said stopper portion has a radius of curvature that is substantially equal to a radius of curvature of the inner periphery of said cylindrical body side metal fitting, so that contacting portions of said stopper portion will contact said cylindrical body side metal fitting in response to a radial load along the one direction of the two radial directions over a wide contact area.

11. An engine mount as claimed in claim 10, wherein said rubber stopper portion comprises an outer peripheral flange protruding radially outwardly from said engine side metal fitting and a rubber coating covering an outer periphery of said outer peripheral flange, wherein a center of curvature of the outer periphery of said outer peripheral flange, at the contacting portions of said stopper portion, is displaced from a center of curvature of an outer periphery of said rubber coating along the one direction, and wherein a radius of curvature of the outer periphery of said outer peripheral flange being equal to a radius of curvature of the outer periphery of said rubber coating, so that the contacting portions of the rubber coating, located along the one direction, have a consistent thickness in a circumferential direction thereof.

12. An engine mount as claimed in claim 11, wherein the one direction of the two radial directions, which are orthogonal to each other in a radial plane, is a principal load applying direction of the engine mount.

13. An engine mount as claimed in claim 8, wherein the thickness of the rubber layer at the contact portions is greater than the thickness of the rubber coating located in the other direction of the two radial directions, 14. An engine mount as claimed in claim 10, wherein said stopper portion comprises an outer peripheral flange protruding radially outwardly from said engine side metal fitting and a rubber coating that covers an outer periphery of said outer peripheral flange, wherein the outer periphery of said outer peripheral flange is formed substantially in the shape of an ellipse, and the contacting portions are positioned along the one direction, which is in a direction of a short diameter of the ellipse, wherein the center of curvature of the outer periphery of said outer peripheral flange, positioned in the direction of the short diameter of the ellipse, is directed from a center of curvature of an outer periphery of said rubber coating in the one direction, and wherein a radius of curvature of the outer periphery of said outer peripheral flange is equal to a radius of curvature of the outer periphery of the rubber coating, so that the contact portions positioned in the one direction have a constant thickness in a circumferential direction thereof.

15. An engine mount as claimed in claim 14, wherein the one direction of the two radial directions, which are orthogonal to each other in a radial plane, is a principal load applying direction of the engine mount.

16. An engine mount as claimed in claim 15, wherein the thickness of the rubber layer at the contact portions is greater than the thickness of the rubber coating located in the other direction of the two radial directions.

17. An engine mount as claimed in claim 10 wherein the one direction of the two radial directions, which are orthogonal to each other in a radial plane, is a principal load applying direction of the engine mount.

18. An engine mount as claimed in claim 17, wherein the thickness of the rubber layer at the contact portions is greater than the thickness of the rubber coating located in the other direction of the two radial directions.

* * * * *